Dec. 6, 1966 W. B. GIST, JR 3,289,413
FLUID MIXING APPARATUS FOR TURBOFAN ENGINES
Filed Aug. 19, 1964 2 Sheets-Sheet 1
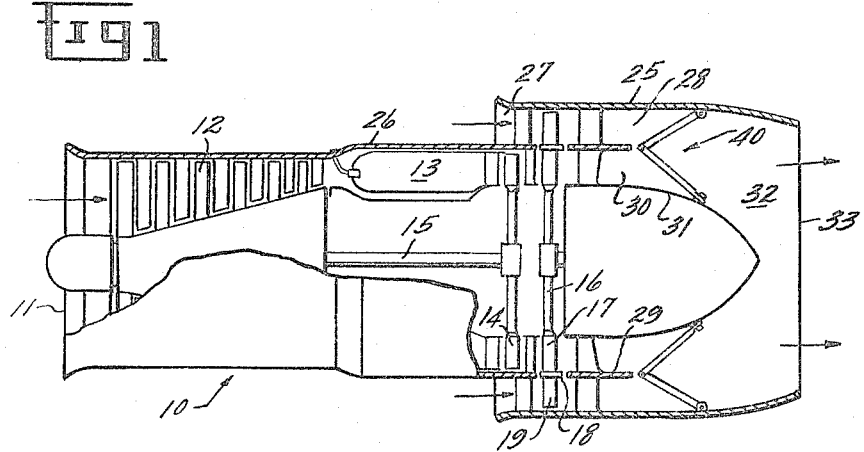
INVENTOR.
WILLIAM B. GIST
BY
George R. Power
ATTORNEY- INVENTOR.
WILLIAM B. GIST
BY George R. Powers
ATTORNEY

United States Patent Office 3,289,413
Patented Dec. 6, 1966

3,289,413
FLUID MIXING APPARATUS FOR TURBOFAN ENGINES
William Bruce Gist, Jr., Lynnfield, Mass., assignor to General Electric Company, a corporation of New York
Filed Aug. 19, 1964, Ser. No. 390,567
13 Claims. (Cl. 60—263)

This invention relates to fluid mixing apparatus and, more particularly, to improved apparatus for efficiently and rapidly mixing the bypass and primary streams of a turbofan engine.

In a turbofan engine, the high-energy products of combustion produced by the gas generator drive a bypass fan prior to being discharged, the extracted energy being used to accelerate a mass of ambient air known as "bypass air." Both "mixed" and "unmixed" flow arrangements are utilized by conventional turbofan engines. In the unmixed arrangement, the products of combustion and the bypass air are discharged as separate streams, the total thrust produced by the engine being the sum of the thrusts of the two independent streams. In the mixed arrangement, the two streams are physically mixed prior to being discharged such that the composite stream exhausted from the engine has a substantially uniform energy, or temperature, distribution. The total thrust of an engine utilizing the mixed arrangement is the thrust produced by the single composite stream. Well-known theoretical considerations indicate that, for the same exhaust pressure, total mass flow, and total energy, the thrust produced by a mixed flow arrangement should be greater than that produced by an unmixed arrangement. In the range of practical interest, these theoretical considerations indicate that mixing should increase the total thrust by two to five precent over that produced by the unmixed arrangement. These theoretical considerations do not, however, take into account pressure losses which inevitably result from mixing in an actual engine and which can reduce substantially, or even eliminate, the theoretical gain calculated for a loss-free process. Even where the mixing is done in an efficient manner, past experience indicates that the size and accompanying weight of the additional apparatus required to accomplish the mixing may reduce greatly the net effect on the aircraft of an increase in gross thrust.

Thus, while it is well known that the mixing should ideally be done in an efficient manner by lightweight and compact mixing apparatus, past efforts to provide such devices have not been too satisfactory. For the most part, prior art mixers depend on diffusion and relative axial shear velocities between the primary and bypass streams. As a result, the apparatus must have substantial axial mixing length in order to attain satisfactory efficiency. Since there is typically an almost direct relationship between axial length and weight, these known devices tend to be excessively heavy.

It is, therefore, a primary object of this invention to provide improved mixing apparatus for efficiently mixing the bypass and primary streams of a turbofan engine.

Another object is to provide efficient and lightweight mixing apparatus for a turbofan engine.

A further object of this invention is to provide for a turbofan engine mixing apparatus having both relatively short axial length and low pressure losses.

Yet another object is to provide the above objects through use of a structural arrangement which is not only compact and lightweight, but also relatively simple, inexpensive, and durable in the high temperature environment of a turbofan exhaust system.

Briefly stated, in accordance with an illustrated embodiment of the invention, the exhaust products and the bypass air streams of a turbofan engine flow through annular passageways formed by concentric walls. The outer wall extends downstream of the downstream ends of the passageways and forms a mixing chamber within which the exhaust products and the bypass air are mixed in a relatively short axial distance. This is accomplished by a structural arrangement which channels each of the fluids into a plurality of streams and then directs the streams into the mixing chamber in interdigitated relationship, the direction being such that the streams have substantial relative radial velocity components.

While the invention is distinctly claimed and particularly pointed out in the claims appended hereto, the invention, both as to organization and content, will be better understood and appreciated, along with other objects and features thereof, from the following detailed description when taken in conjunction with the drawing in which:

FIG. 1 is a cross-sectional view of a turbofan engine utilizing the fluid mixing apparatus of this invention;

FIG. 2 is an enlarged view of the mixing apparatus illustrated by FIG. 1;

FIG. 7 is a view similar to FIG. 2 showing a second embodiment of this invention.

Figure 3:
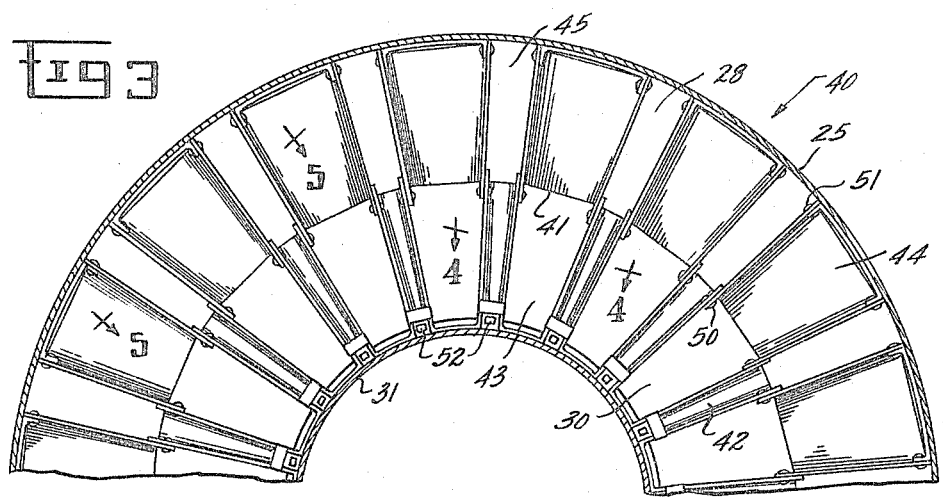
FIG. 3 is a view of the mixing apparatus taken along viewing line 3—3 of FIG. 2.

Referring first to FIG. 1, a gas turbine engine 10 is illustrated, the engine 10 being of the type commonly referred to as a "turbofan" engine and, more particularly, as an "aft-fan" engine. The engine 10 has a gas generator comprised of an inlet 11, an axial flow compressor 12, a combustor 13, and a gas generator turbine 14. The gas generator turbine 14 is driven by combustion products discharged from the combustor 13, and the turbine 14 in turn drives the compressor 12 through a shaft 15. The fan assembly is mounted axially downstream of the gas generator and comprises a power turbine and a fan in a single rotor assembly. As illustrated, the aft-fan rotor 16 is rotatably mounted immediately downstream of the gas generator turbine 14, the power turbine portion comprising a peripheral row of circumferentially spaced turbine buckets 17 mounted on the rotor 16. The turbine buckets 17 support a peripheral shroud or platform 18 at their radially outer ends, and a peripheral row of circumferentially spaced compressor or fan blades 19 comprising the fan portion of the fan assembly are mounted on the shroud 18. The exhaust products from the turbine 14 flow through the turbine buckets 17 to drive fan assembly.

With reference still being directed to FIG. 1, an axially extending casing 25 surrounds the fan blades 19 and forms with the casing 26 of the gas generator an inlet passageway 27 to the fan portion of the fan assembly for the entry of bypass air. The bypass air is accelerated as it passes through the fan blades 19 and is discharged therefrom into an outer annular passageway 28 formed between the fan casing 25 and an intermediate wall 29. The products of combustion driving the fan assembly are discharged from the turbine buckets 17 into an inner annular passageway 30 formed between the intermediate wall 29 and the exhaust cone wall 31. The concentric walls 25, 29, and 31 are substantially cylindrical, and the outer casing 25 and the inner exhaust cone wall 31 extend downstream of the intermediate wall 29 to form a mixing chamber or exhaust collector 32 axially downstream of the axially extending outer and inner passageways 28 and 30, respectively. The mixing chamber 32 has an exhaust opening 33 at its downstream end through which the mixed exhaust products can be discharged to propel an aircraft.

Figure 4:
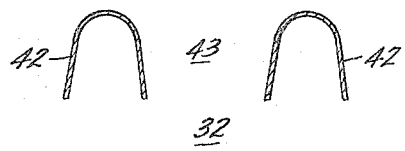
FIG. 4 is an enlarged view taken along viewing line 4—4 of FIG. 3.
Figure 5:
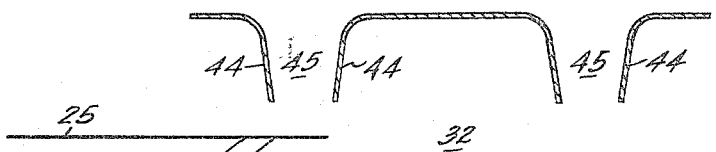
FIG. 5 is an enlarged view taken along viewing line 5—5 of FIG. 3.

The fluid mixing apparatus of the present invention will now be described. As illustrated, an annular grid 40 of flow directing members extends across the upstream end of the mixing chamber 32 immediately downstream of the intermediate wall 29 and the passageways 28 and 30. In cross-section, the annular grid 40 has a V-shaped configuration diverging in the downstream direction, its apex 41 being radially aligned with and immediately downstream of the intermediate wall 29. The frusto-conical inner wall of the grid 40, which is radially coextensive with the inner passageway 30, converges in the downstream direction from the apex 41 and is comprised of a plurality of circumferentially spaced sheet metal members 42 forming a first plurality of circumferentially spaced passages 43 therebetween, the passages 43 converging slightly in the downstream direction as shown by FIG. 4. The frusto-conical outer wall of the grid 40, which is radially coextensive with the outer passageway 28, diverges in the downstream direction from the apex 41 and is also comprised of a plurality of circumferentially spaced sheet metal members 44. The members 44 are positioned radially outward of the passages 43 in one to one relationship as illustrated by FIG. 3, a second plurality of circumferentially spaced passages 45 being formed between adjacent ones of the members 44. As the passages 43, the passages 44 converge slightly in the downstream direction as shown by FIG. 5.

Figure 6:
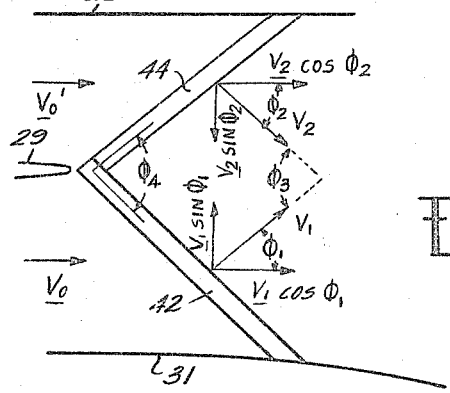
FIG. 6 is a view of the flow directing grid showing fluid velocities and angles.

It is well-known that a fluid will normally flow through a passage or nozzle in the direction of the longitudinal axis of the passage. This invention utilizes this fact to provide efficient mixing apparatus having a relatively short axial length and low pressure losses. During turbofan operation, the combustion products in the inner passageway 30 approach the grid 40 with an initial velocity $\underline{V}_0$, and the bypass air in the outer passageway 28 is flowing with a velocity $\underline{V}_0'$, the fan assembly preferably being designed such that these velocities are substantially equal. As best shown by FIGS. 2 and 6, the combustion products are channelled by the members 42 into the passages 43 and turned through an angle $\phi_1$ prior to being discharged into the mixing chamber 32 as a plurality of unconfined streams along the longitudinal axes of the passages 43. Due to the slight convergence of the passages 43, the combustion products are accelerated to a discharge velocity $\underline{V}_1$. In practice, it may be desirable to form the passages 43 such that the axial downstream velocity component, $\underline{V}_1 \cos \phi_1$, of the accelerated streams is equal to the velocity $\underline{V}_0$ in the passageway 30. In a similar manner, the bypass air in the outer passageway 28 is channelled by the members 44 into the passages 45 and is turned through an angle $\phi_2$ prior to being discharged into the mixing chamber 32 as a plurality of unconfined streams along the longitudinal axes of the passages 45. The discharge velocity of the streams of bypass air is $\underline{V}_2$; it may be desirable to form the passages 45 such that the axial velocity component, $\underline{V}_2 \cos \phi_2$, is equal to $\underline{V}_0'$ and $\underline{V}_0$.

It will be seen, however, that the interdigitated streams of products of combustion and bypass air also have substantial oppositely directed radial velocity components $\underline{V}_1 \sin \phi_1$ and $\underline{V}_2 \sin \phi_2$, respectively. The high relative radial shear velocities between the unconfined streams cause rapid and complete mixing in a short axial distance.

It would therefore appear that mixing could be made to occur even more rapidly by turning the streams through greater angles. Recognizing, however, that a pressure loss is involved in accelerating the streams, and recognizing further that greater and greater acceleration is required to maintain the proper axial velocity as the angles increase (the cosine decreases rapidly), it will be appreciated that there is an optimum range of angles in which either the pressure loss is not excessive or the axial velocity is not reduced excessively. This optimum range has been found to be 25 to 60 degrees. Accordingly, with the angles $\phi_1$ and $\phi_2$ being assumed to be substantially equal as they normally will be in practice, it can be said that the interdigitated streams should intersect at an upstream angle $\phi_3$ having a range of 50 to 120 degrees. Another way to state this requirement would be to require that the members 42 and 44 be mounted such that the angle $\phi_4$ of divergence between the walls of the grid 40 in the downstream direction is in the range of 60 to 130 degrees.

During operation, the flow directing members 42 are subjected to the high temperature products of combustion while the members 44 are exposed to the relatively low temperature bypass air. In order to prevent thermal stresses and resulting damage, the grid 40 is supported in a substantially stress-free manner. As best shown by FIGS. 2 and 3, the members 42 and 44 are pivotally connected at the apex 41 by pins 50 which permit relative pivoting motion between the members. In a similar manner, the members 44 are pivotally connected to the fan casing 25 by pins 51, and the members 42 are slidably connected at 52 to the exhaust cone wall 31. Thermal expansion and contraction can thus be accommodated without the creation of stresses which could ultimately result in fatigue cracks and other damage to the grid 40.

As observed previously, a fluid will normally flow through a passage in the direction of the longitudinal axis of the passage. Because of this, the fluid mixing apparatus described above and illustrated by FIGS. 1–6 is quite effective for most applications. If, however, the fluid approaching the grid of flow directing members is flowing with too great a velocity, the fluid may pass through the grid without being turned completely. A second embodiment of the present invention particularly suited for use with high flow velocities is illustrated by FIG. 7. The grid 40′ shown by FIG. 7 is essentially similar to the grid 40 of FIGS. 1–6, similar elements being indicated by primed numerals. In addition to the flow directing members 42′ and 44′, the grid 40′ has vanes 60 and 61 to aid in turning the combustion products and the bypass air through the angles $\phi_1'$, and $\phi_2'$, respectively.

While preferred embodiments of the invention have been illustrated and described, it will be obvious that other arrangements could be utilized. For example, it is not necessary to the practice of the invention that the flow directing members be arrayed in the precise manner described. Instead, for example, a plurality of circumferentially spaced independently mounted flow directing members could be provided at the downstream end of the inner passageway 30, and a similar plurality of members could be independently mounted at the downstream end of the outer passageway 28. It will thus be understood that various changes and modifications may be made without departing from the spirit and scope of the invention. Therefore, it is intended to cover all such changes and modifications by the appended claims.

What is claimed as new and desired to secure by Letters Patent of the United States is:

1. Fluid mixing apparatus comprising:
   (a) concentric walls forming inner and outer annular axially extending passageways having upstream and downstream ends,
   (b) at least one wall forming a mixing chamber axially downstream of said inner and outer passageways,
   (c) and first and second flow directing means between said inner and outer passageways, respectively, and said mixing chamber,
   (d) each of said first and second flow directing means being radially coextensive with the respective passageway and adapted to channel the entire flow of fluid from the respective passageway into a plurality of streams and to discharge the streams therefrom into said mixing chamber in interdigitated relationship with the unconfined streams of fluid discharged from the flow directing means of the other of said passageways, said streams having substantial velocity components in both the radial and the axially downstream directions, (e) whereby mixing occurs in a short axial distance due to the high relative radial velocities of the interdigitated streams of fluid entering said mixing chamber.

2. Fluid mixing apparatus as defined by claim 1 in which each of said first and second flow directing means is comprised of a plurality of circumferentially spaced members forming therebetween a plurality of circumferentially spaced passages through which fluid is channelled, the members of said first flow directing means located radially inward of the passages of said second flow directing means in one to one relationship.

3. Fluid mixing apparatus as defined by claim 2 in which said circumferentially spaced members are mounted in a stress-free manner.

4. Fluid mixing apparatus as defined by claim 2 in which supplementary fluid turning vanes are located in said circumferentially spaced passages to turn the fluid flowing therethrough to increase the radial component of velocity.

5. Fluid mixing apparatus as defined by claim 2 in which said circumferentially spaced members are positioned such that the interdigitated streams of fluid entering the mixing chamber intersect at an upstream angle having a magnitude in the range of 50 to 120 degrees.

6. Fluid mixing apparatus comprising:
(a) concentric inner, intermediate, and outer walls forming therebetween inner and outer annular axially extending passageways having upstream and downstream ends, said inner and outer walls extending downstream of said intermediate wall and said passageways,
(b) said inner and outer walls forming a mixing chamber axially downstream of said inner and outer passageways,
(c) a first plurality of circumferentially spaced members radially coextensive with said inner passageway between said inner passageway and said mixing chamber forming a first plurality of circumferentially spaced passages therebetween to channel the entire flow of fluid from said inner passageway into a plurality of streams and to discharge the streams therefrom into said mixing chamber,
(d) and a second plurality of circumferentially spaced members radially coextensive with said outer passageway between said outer passageway and said mixing chamber located radially outward of said first plurality of passages and forming a second plurality of circumferentially spaced passages therebetween to channel the entire flow of fluid from said outer passageway into a plurality of streams and to discharge the streams therefrom into said mixing chamber in interdigitated relationship with the streams from said inner passageway,
(e) said interdigitated streams of fluid intersecting at an upstream angle having a magnitude in the range of 50 to 120 degrees,
(f) whereby mixing occurs in a short axial distance due to the high relative radial velocities of the interdigitated streams of fluids entering said mixing chamber.

7. Fluid mixing apparatus as defined by claim 6 in which supplementary fluid turning vanes are located in said circumferentially spaced passages to turn the fluid flowing therethrough to increase the magnitude of the upstream angle of intersection of the interdigitated streams.

8. Fluid mixing apparatus comprising:
(a) concentric inner, intermediate, and outer walls forming therebetween inner and outer annular axially extending passageways having upstream and downstream ends, said inner and outer walls extending downstream of said intermediate wall and said passageways,
(b) said inner and outer walls forming a mixing chamber axially downstream of said inner and outer passageways,
(c) and an annular grid extending across said mixing chamber immediately downstream of said intermediate wall and said passageways,
(d) said grid having a V-shaped cross-section diverging in the downstream direction and including:
(1) a first plurality of circumferentially spaced members radially coextensive with said inner passageway between said inner passageway and said mixing chamber forming a first plurality of circumferentially spaced passages therebetween to channel the entire flow of fluid from said inner passageway into a plurality of streams and to discharge the streams therefrom into said mixing chamber,
(2) and a second plurality of circumferentially spaced members radially coextensive with said outer passageway between said outer passageway and said mixing chamber located radially outward of said first plurality of passages and forming a second plurality of circumferentially spaced passages therebetween to channel the entire flow of fluid from said outer passageway into a plurality of streams and to discharge the streams therefrom into said mixing chamber in interdigitated relationship with the streams from said inner passageway,
(e) said interdigitated streams of fluid intersecting at an upstream angle having a magnitude in the range of 50 to 120 degrees.

9. Fluid mixing apparatus as defined by claim 8 in which supplementary fluid turning vanes are located in said circumferentially spaced passages to turn the fluid flowing therethrough to increase the magnitude of the upstream angle of intersection of the interdigitated streams.

10. Fluid mixing apparatus for use in a turbofan gas turbibne engine including a gas generator, a power turbine, and a fan driven by said power turbine, said fluid mixing apparatus comprising:
(a) concentric, inner, intermediate, and outer walls forming therebetween inner and outer concentric axially extending passageways having upstream and downstream ends, said inner passageway adapted to receive exhaust products from a power turbine at its upstream end and said outer passageway adapted to receive bypass air from a fan at its upstream end,
(b) said inner and outer walls extending downstream of said intermediate wall and said passageways and forming a mixing chamber axially downstream of said inner and outer passageways,
(c) and an annular grid extending across said mixing chamber immediately downstream of said intermediate wall and said passageways,
(d) said grid having a V-shaped cross-section diverging in the downstream direction and including:
(1) a first plurality of circumferentially spaced members radially coextensive with said inner passageway between said inner passageway and said mixing chamber forming a first plurality of circumferentially spaced passages therebetween to channel the entire flow exhaust products from a power turbine into a plurality of streams and to discharge the streams therefrom into said mixing chamber, (2) and a second plurality of circumferentially spaced members radially coextensive with said outer passageway between said outer passageway and said mixing chamber located radially outward of said first plurality of passages and forming a second plurality of circumferentially spaced passages therebetween to channel the entire flow of bypass air from a fan into a plurality of streams and to discharge the streams therefrom into said mixing chamber in interdigitated relationship with the streams from said inner passageway, (e) said interdigitated streams of fluid intersecting at an upstream angle having a magnitude in the range of 50 to 120 degrees, (f) whereby mixing of the exhaust products and the bypass air occurs in a short axial distance due to the high relative radial velocities of the interdigitated streams entering said mixing chamber.

11. Fluid mixing apparatus as defined by claim 10 in which said first and second pluralities of circumferentially spaced members are pivotally interconnected, and in which the members of one of said pluralities is pivotally connected to the adjacent of said inner and outer walls and the members of the other of said pluralities is slidably connected to the other of said inner and outer walls.

12. Fluid mixing apparatus as defined by claim 11 in which said first and second pluralities of members are made of thin, lightweight, sheet material.

13. Fluid mixing apparatus as defined by claim 11 in which supplementary fluid turning vanes are located in said circumferentially spaced passages to turn the fluid flowing therethrough to increase the magnitude of the upstream angle of intersection of the interdigitated streams.

References Cited by the Examiner

UNITED STATES PATENTS

| | | | |
|---|---|---|---|
| 2,588,532 | 3/1952 | Johnson | 60—35.6 |
| 2,704,440 | 3/1955 | Nicholson | 60—35.6 |
| 2,826,382 | 3/1958 | Hayden. | |
| 2,934,895 | 5/1960 | Gregory et al. | 60—35.6 |
| 2,978,865 | 4/1961 | Pierce | 60—35.6 |
| 3,048,376 | 8/1962 | Howald et al. | |

MARK NEWMAN, *Primary Examiner.*

CARLTON R. CROYLE, *Examiner.*